US011323705B2

(12) United States Patent
Lee et al.

(10) Patent No.: US 11,323,705 B2
(45) Date of Patent: May 3, 2022

(54) IMAGE ENCODING/DECODING METHOD AND APPARATUS USING SAMPLE FILTERING

(71) Applicant: Electronics and Telecommunications Research Institute, Daejeon (KR)

(72) Inventors: Jin Ho Lee, Daejeon (KR); Jung Won Kang, Daejeon (KR); Ha Hyun Lee, Seoul (KR); Sung Chang Lim, Daejeon (KR); Hui Yong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/979,495

(22) PCT Filed: Mar. 8, 2019

(86) PCT No.: PCT/KR2019/002724
§ 371 (c)(1),
(2) Date: Sep. 9, 2020

(87) PCT Pub. No.: WO2019/172705
PCT Pub. Date: Sep. 12, 2019

(65) Prior Publication Data
US 2021/0021818 A1    Jan. 21, 2021

(30) Foreign Application Priority Data

Mar. 9, 2018  (KR) .................. 10-2018-0027787
Sep. 20, 2018 (KR) .................. 10-2018-0112690
Dec. 20, 2018 (KR) .................. 10-2018-0166639

(51) Int. Cl.
*H04N 19/52*      (2014.01)
*H04N 19/117*     (2014.01)
(Continued)

(52) U.S. Cl.
CPC ......... *H04N 19/117* (2014.11); *H04N 19/105* (2014.11); *H04N 19/132* (2014.11);
(Continued)

(58) Field of Classification Search
CPC ...... H04N 19/11; H04N 19/83; H04N 19/593; H04N 19/52; H04N 19/105; H04N 19/117; H04N 19/159
See application file for complete search history.

(56) References Cited

U.S. PATENT DOCUMENTS 10,045,042 B2 *  8/2018  Lee .................. H04N 19/13
10,412,402 B2 *  9/2019  Lin .................. H04N 19/503
(Continued)

FOREIGN PATENT DOCUMENTS

KR    1020120125193 A    11/2012
KR    1020130053645 A     5/2013
(Continued)

OTHER PUBLICATIONS

Horizontal-vertical padding scheme for intra block copy; Chang—2014. (Year: 2014).*
(Continued)

*Primary Examiner* — Luis Perez-Fuentes
(74) *Attorney, Agent, or Firm* — William Park & Associates Ltd.

(57) ABSTRACT

There is provided an image encoding/decoding method and apparatus. The image encoding method of the present invention includes: determining whether or not to apply filtering to a filtering target sample; determining a filter type on the basis of the determination; and applying filtering to the filtering target sample by using the determined filter type.

14 Claims, 9 Drawing Sheets

(51) Int. Cl.
  *H04N 19/105* (2014.01)
  *H04N 19/132* (2014.01)
  *H04N 19/159* (2014.01)
  *H04N 19/176* (2014.01)
  *H04N 19/82* (2014.01)

(52) U.S. Cl.
  CPC ......... *H04N 19/159* (2014.11); *H04N 19/176* (2014.11); *H04N 19/52* (2014.11); *H04N 19/82* (2014.11)

(56) References Cited

U.S. PATENT DOCUMENTS

| | | | | |
|---|---|---|---|---|
| 10,499,053 | B2* | 12/2019 | Chen | H04N 19/593 |
| 10,574,984 | B2* | 2/2020 | Son | H04N 19/593 |
| 10,694,202 | B2* | 6/2020 | Zhang | H04N 19/86 |
| 10,778,975 | B2* | 9/2020 | Park | H04N 19/136 |
| 10,992,963 | B2* | 4/2021 | Ikonin | H04N 19/132 |
| 2013/0215968 | A1 | 8/2013 | Jeong et al. | |
| 2015/0103897 | A1 | 4/2015 | Kim et al. | |
| 2015/0382009 | A1 | 12/2015 | Chen et al. | |

FOREIGN PATENT DOCUMENTS

| | | |
|---|---|---|
| KR | 1020140019221 A | 2/2014 |
| KR | 1020170054561 A | 5/2017 |
| KR | 1020170089953 A | 8/2017 |
| KR | 1020170116850 A | 10/2017 |
| KR | 1020180001479 A | 1/2018 |
| WO | 2012148138 A2 | 11/2012 |
| WO | 2017190288 A1 | 11/2017 |

OTHER PUBLICATIONS

Constrained Intra prediction scheme for flexible size prediction units in HEVC;—2011. (Year: 2011).*
Constrained Intra Source Code Implementation; Sjoberg—2011. (Year: 2011).*
Direction based Angular Intra Prediction; Guo—2011. (Year: 2011).*
Planar intra prediction; Chen—2011. (Year: 2011).*
Implicit derivation for adaptively turning filtering off in intra prediction; Kang—2013. (Year: 2013).*
Optionally disabling the usage of the intra boundary filter; Zhang—2014. (Year: 2014).*
Jiahao Li et al., "Efficient Multiple-Line-Based Intra Prediction for HVEC", IEEE Transactions On Circuits and Systems for Video Technology, Dec. 2, 2016, pp. 947-957, vol. 28, No. 4, XP055713932.
Li et al., "Multiple line-based intra prediction", 3. JVET Meeting; May 26, 2016-Jun. 1, 2016; Geneva; (The Joint Video Exploration Team of ISO/IEC JTC1/SC29/WG11 and ITU-T SG.16), May 26, 2016, pp. 1-6, No. JVET-C0071, XP030247189, Peking University.
Li et al., "Multiple line-based intra prediction"; 3. JVET Meeting; May 26, 2016-Jun. 1, 2016; Geneva; (The Joint Video Exploration Team of ISO/IEC JTC1/SC29/WG11 and ITU-T SG.16), May 26, 2016, No. JVET-C0071, XP030247190, Peking University.

* cited by examiner

IMAGE ENCODING/DECODING METHOD AND APPARATUS USING SAMPLE FILTERING

TECHNICAL FIELD

The present invention relates to an image encoding/decoding method and apparatus, and a recording medium storing a bitstream. More particularly, the present invention relates to an image encoding/decoding method and apparatus based on sample filtering.

BACKGROUND ART

These days, the demand for high-resolution, high-quality video such as high definition (HD) video and ultra high definition (UHD) video is increasing in various applications. As video has higher resolution and quality, the amount of video data increases as compared with existing video data. Therefore, when video data is transmitted through a medium such as a wired/wireless broadband line or is stored in an existing storage medium, transmission or storage cost is increased. In order to solve such a problem with high-resolution, high-quality video data, a high-efficiency video encoding/decoding technique is required.

There are various video compression techniques such as an inter prediction technique for predicting values of pixels within a current picture from values of pixels within a preceding picture or a subsequent picture, an intra prediction technique for predicting values of pixels within a region of a current picture from another region of the current picture, a transform and quantization technique for compressing energy of a residual signal, and an entropy encoding technique for allocating shorter codes for frequently occurring pixel values and longer codes for less-occurring pixel values. With these video compression techniques, video data can be effectively compressed, transmitted, and stored.

DISCLOSURE

Technical Problem

An objective of the present invention is to provide an image encoding/decoding method and apparatus using sample filtering.

In addition, another objective of the present invention is to provide an image encoding/decoding method and apparatus, wherein coding efficiency is improved by determining a filtering target sample or area or both, and performing filtering by determining whether or not to apply filtering or determining a type or both.

In addition, another objective of the present invention is to provide a recoding medium storing a bitstream generated by an image encoding/decoding method or apparatus of the present invention.

Technical Solution

A video encoding method according to the present invention, the method may comprise determining whether or not to apply filtering to a filtering target sample; determining a filter type on the basis of the determination; and applying filtering to the filtering target sample by using the determined filter type.

In the video encoding method according to the present invention, wherein the filtering target sample includes at least one of a prediction sample, a reference sample, a reconstructed sample, and a residue sample.

In the video encoding method according to the present invention, wherein whether or not to apply filtering is determined on the basis of at least one of a coding mode, an intra-prediction mode, an inter-prediction mode, transform information, filtering information, a size (horizontal or vertical size), a shape, and a reference sample line of a current block, and a coding mode, an intra-prediction mode, an inter-prediction mode, transform information, filtering information, a size (horizontal or vertical size), a shape, and a reference sample line of a neighbor block.

In the video encoding method according to the present invention, wherein whether or not to apply filtering is determined on the basis of whether or not the current block has a non-square shape.

In the video encoding method according to the present invention, the method further may comprise determining whether or not an intra-prediction mode of the current block is a predetermined directional mode.

In the video encoding method according to the present invention, wherein the filter type includes at least one of a filter tap, a filter shape, and a filter coefficient.

In the video encoding method according to the present invention, wherein the filter type is determined when filtering is determined to be applied to the filtering target sample.

In the video encoding method according to the present invention, wherein the filter type is determined on the basis of a location of the filtering target sample.

In the video encoding method according to the present invention, wherein the filter type is determined on the basis of at least one of a size of and a prediction mode a current block.

A video decoding method according to the present invention, the method may comprise determining whether or not to apply filtering to a filtering target sample; determining a filter type on the basis of the determination; and applying filtering to the filtering target sample by using the determined filter type.

In the video decoding method according to the present invention wherein the filtering target sample includes at least one of a prediction sample, a reference sample, a reconstructed sample, and a residue sample.

In the video decoding method according to the present invention wherein whether or not to apply filtering is determined on the basis of at least one of a coding mode, an intra-prediction mode, an inter-prediction mode, transform information, filtering information, a size (horizontal or vertical size), a shape, and a reference sample line of a current block, and a coding mode, an intra-prediction mode, an inter-prediction mode, transform information, filtering information, a size (horizontal or vertical size), a shape, and a reference sample line of a neighbor block.

In the video decoding method according to the present invention, wherein whether or not to apply filtering is determined on the basis of whether or not the current block has a non-square shape.

In the video decoding method according to the present invention, the method further may comprise determining whether or not an intra-prediction mode of the current block is a predetermined directional mode.

In the video decoding method according to the present invention, wherein the filter type includes at least one of a filter tap, a filter shape, and a filter coefficient.

In the video decoding method according to the present invention, wherein the filter type is determined when filtering is determined to be applied to the filtering target sample.

In the video decoding method according to the present invention, wherein the filter type is determined on the basis of a location of the filtering target sample.

In the video decoding method according to the present invention, wherein the filter type is determined on the basis of at least one of a size and a prediction mode of a current block.

In the video decoding method according to the present invention, wherein applying filtering to the filtering target sample is performed on the basis of a distance between the filtering target sample and a reference sample.

Also, a computer-readable recording medium according to the present invention may store a bitstream generated by a video encoding method according to the present invention.

Advantageous Effects

According to the present invention, there is provided an image encoding/decoding method and apparatus using sample filtering In addition, according to the present invention, there is provided an image encoding/decoding method and apparatus, wherein coding efficiency is improved by determining a filtering target sample or area or both, and performing filtering by determining whether or not to apply filtering or determining a type or both.

In addition, according to the present invention, there is provided a recoding medium storing a bitstream generated by an image encoding/decoding method or apparatus of the present invention.

In addition, according to the present invention, image encoding or decoding or both efficiency can be improved.

MODE FOR INVENTION

Figure 1:
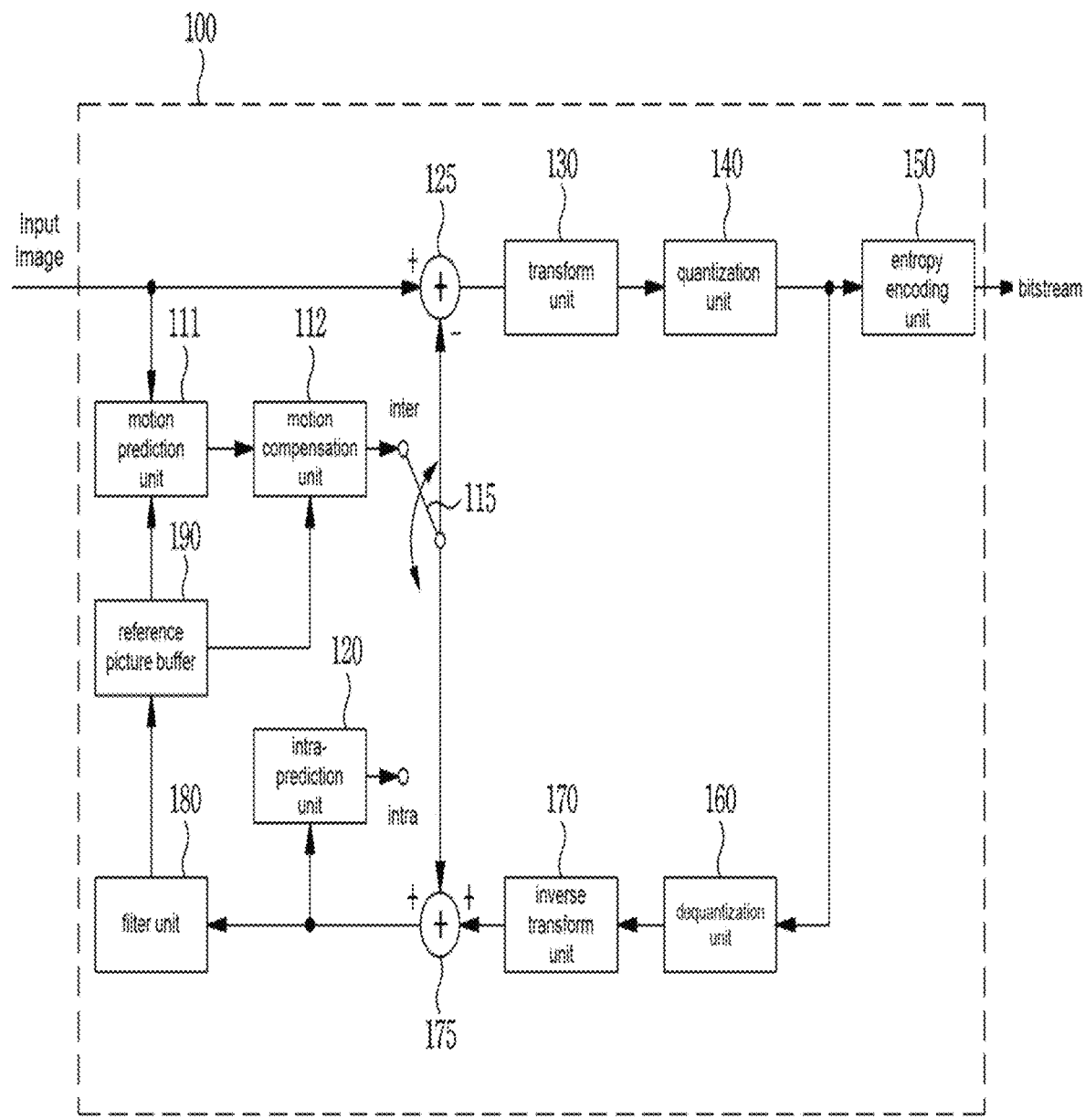
FIG. 1 is a block diagram showing a configuration of an embodiment of an encoding apparatus to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means an decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quarternary-tree.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node(Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, a inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a residual of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
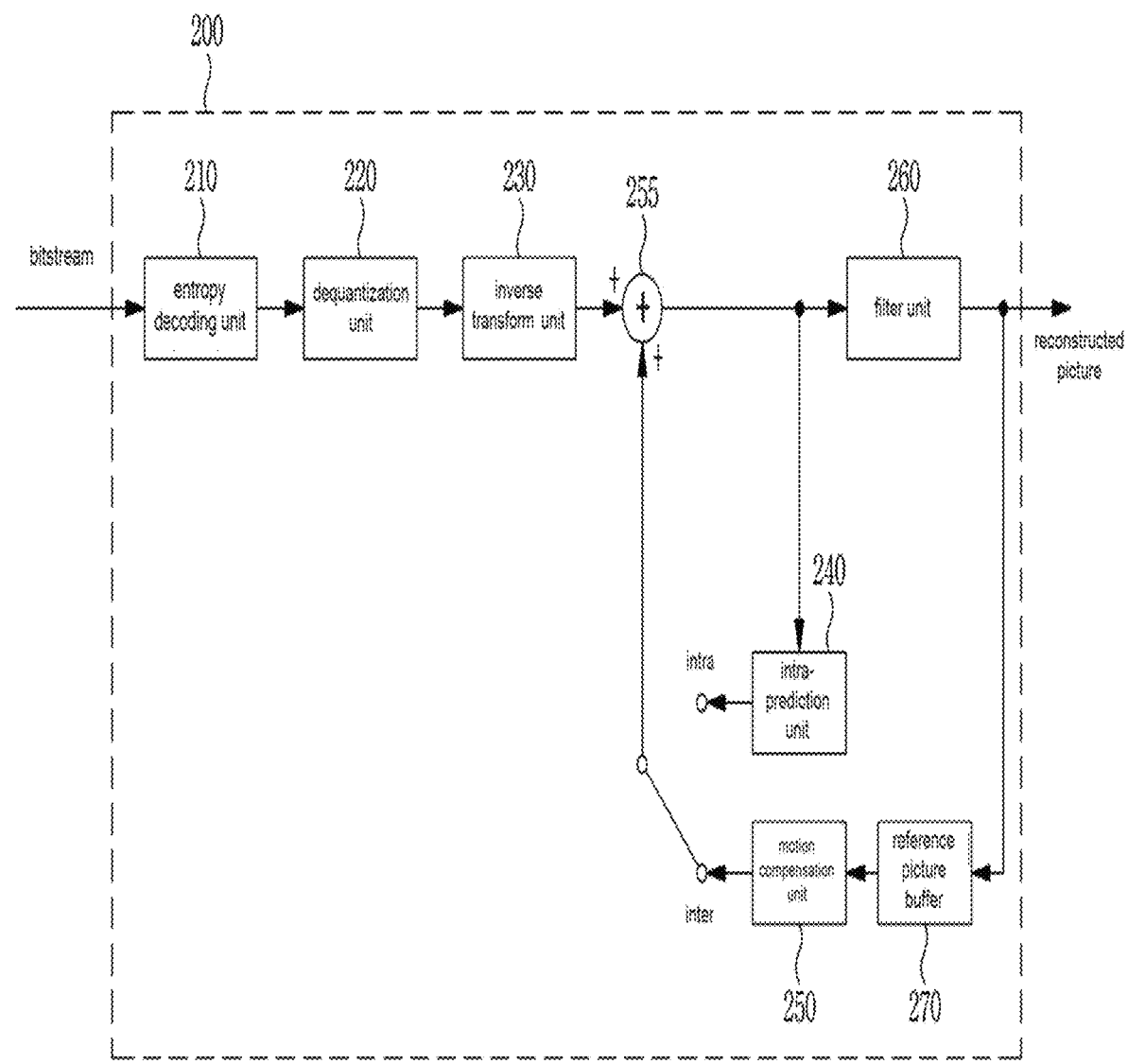
FIG. 2 is a block diagram showing a configuration of an embodiment of a decoding apparatus to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, a inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be a inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
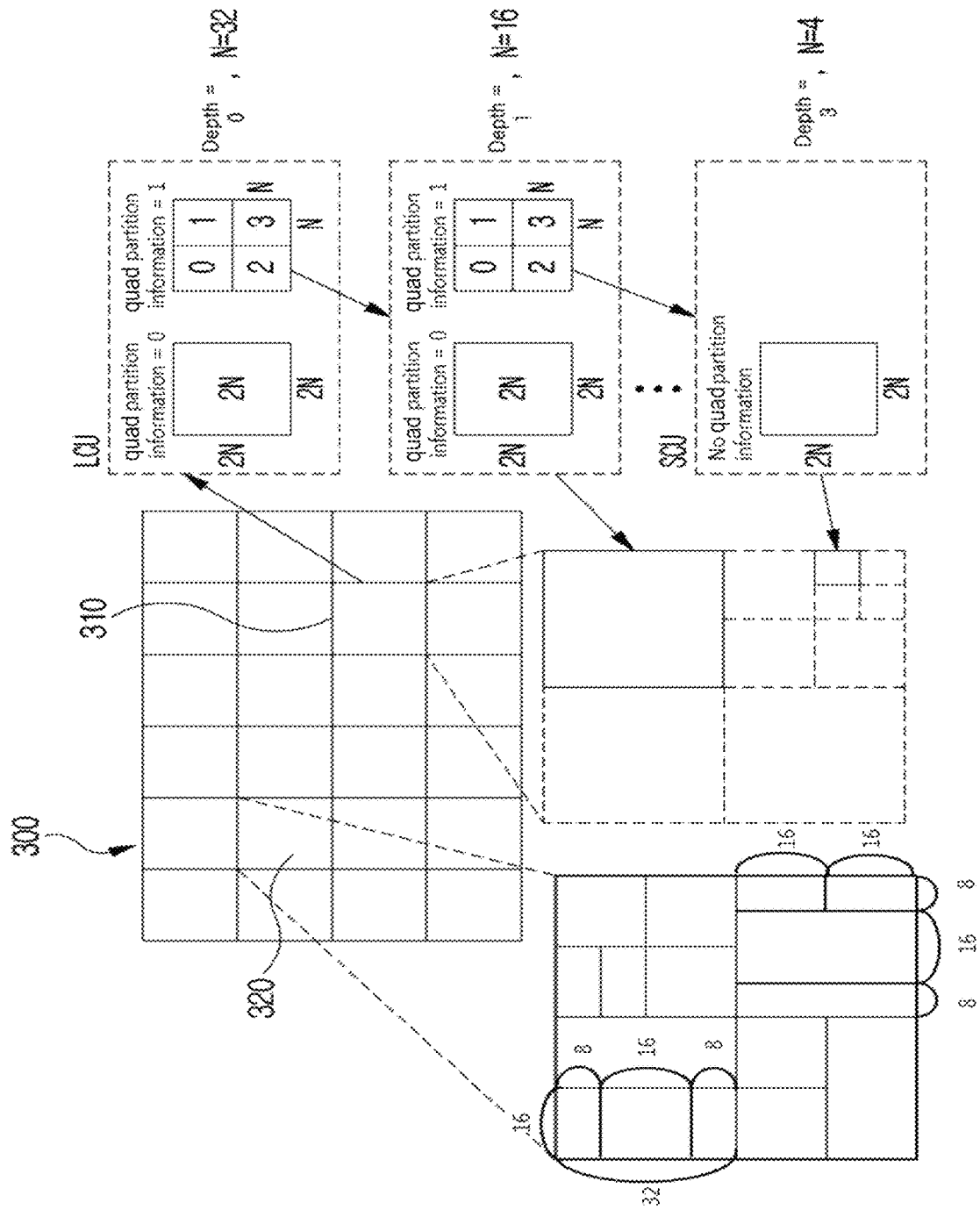
FIG. 3 is a view schematically showing a division structure of an image when performing image encoding and decoding.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, when the depth of a coding unit corresponding to a node of a multi-type tree is equal to the maximum depth of the multi-type tree, the coding unit may not be further binary-partitioned and/or ternary-partitioned.

Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
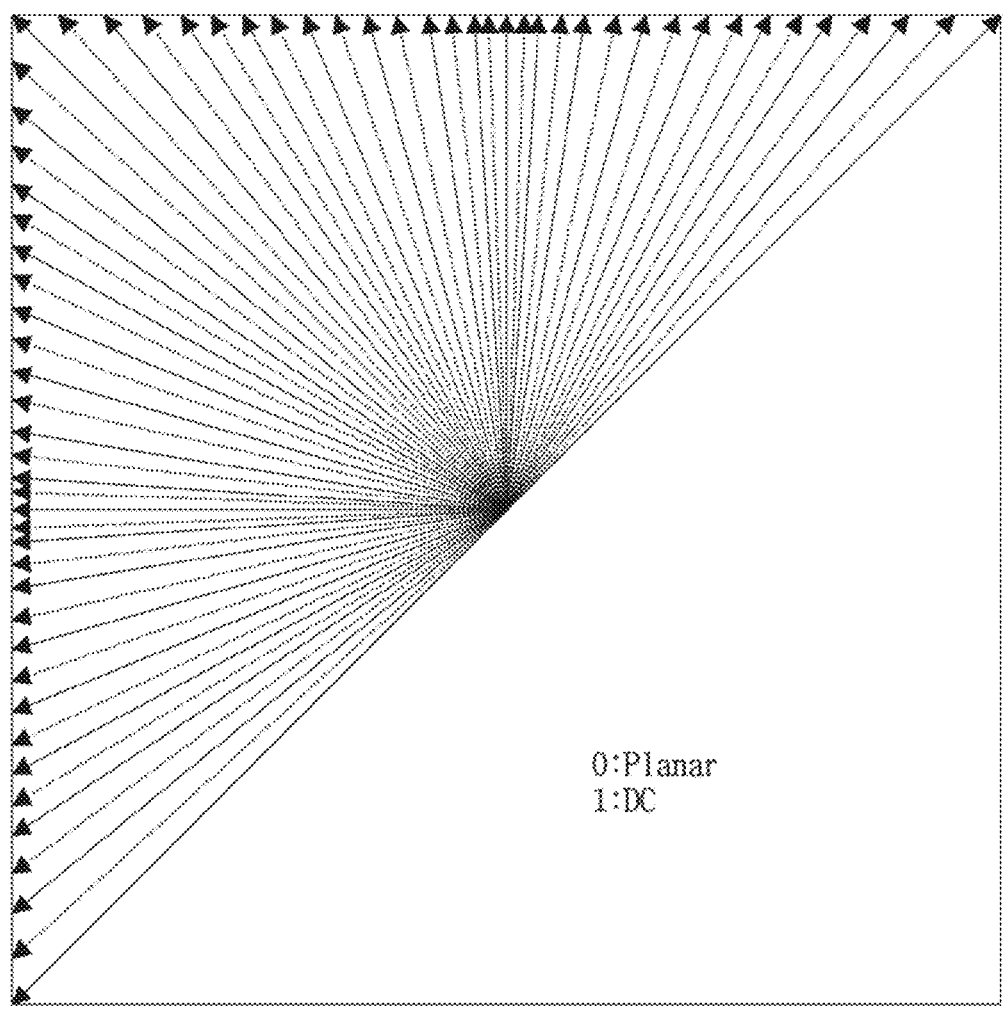
FIG. 4 is a view showing an embodiment of intra-prediction.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode.

In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
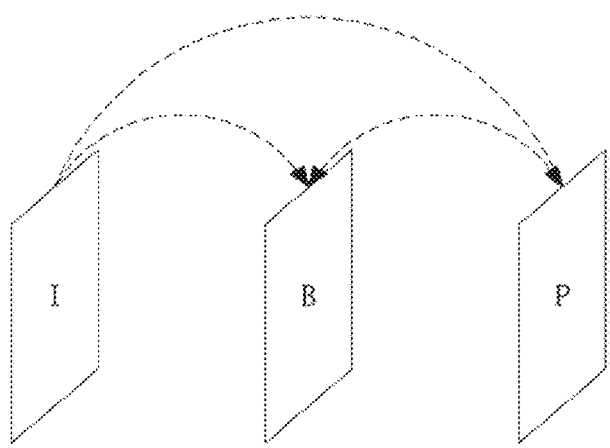
FIG. 5 is a view showing an embodiment of inter-prediction.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

A method of deriving the motion information of the current block may vary depending on a prediction mode of the current block. For example, as prediction modes for inter-picture prediction, there may be an AMVP mode, a merge mode, a skip mode, a current picture reference mode, etc. The merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least either one of the zero merge candidate and new motion information that is a combination of the motion information (spatial merge candidate) of one neighboring block adjacent to the current block, the motion information (temporal merge candidate) of the collocated block of the current block, which is included within the reference picture, and the motion information exiting in the merge candidate list.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The current picture reference mode may mean a prediction mode in which a previously reconstructed region within a current picture to which the current block belongs is used for prediction. Here, a vector may be used to specify the previously-reconstructed region. Information indicating whether the current block is to be encoded in the current picture reference mode may be encoded by using the reference picture index of the current block. The flag or index indicating whether or not the current block is a block encoded in the current picture reference mode may be signaled, and may be deduced based on the reference picture index of the current block. In the case where the current block is encoded in the current picture reference mode, the current picture may be added to the reference picture list for the current block so as to be located at a fixed position or a random position in the reference picture list. The fixed position may be, for example, a position indicated by a reference picture index of 0, or the last position in the list. When the current picture is added to the reference picture list so as to be located at the random position, the reference picture index indicating the random position may be signaled.

Figure 6:
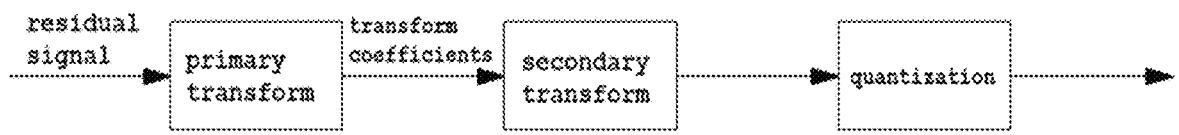
FIG. 6 is a view showing an embodiment of transform and quantization.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, the transform scheme may be determined through signaling of transform information.

Since the residual signal is quantized through the primary transform and the secondary transform, a quantized-level signal (quantization coefficients) is generated. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Hereinafter, referring to FIGS. 7 to 10, an image encoding/decoding method using sample filtering according to an embodiment of the present invention will be described.

In the encoder/decoder, sample filtering may include: determining a filtering target sample; determining whether or not to apply filtering; determining a filter type; and applying a filter.

Hereinafter, determining a filtering target sample will be described.

In determining a filtering target sample, a filtering applying target sample may be determined. For example, encoding efficiency may be improved by applying filtering to at least one sample. The at least one sample may be at least one of a reference sample, a prediction sample, a reconstructed sample, and a residue sample. Herein, the filtering may mean performing weighted sum using a filtering target sample and at least one neighbor sample. Alternatively, the filtering may be a form of reflecting an offset value to a filtering target sample.

According to an embodiment of the present invention, a filtering target sample may be determined as at least one of the following.

In an example, a filtering target sample may be a prediction sample when performing intra or inter-prediction.

In another example, a filtering target sample may be a reference sample adjacent to a current block used for prediction.

In another example, a filtering target sample may be a reference sample included in a reference picture used for prediction.

In another example, a filtering target sample may be a reconstructed sample within a current block or at least one neighbor block.

In another example, a filtering target sample may be a sample obtained by applying at least one filtering to a reconstructed sample.

In another example, a filtering target sample may be a residue sample generated by applying at least one of entropy decoding, dequantization, and inverse-transform to a bitstream.

According to an embodiment of the present invention, a filtering target sample may be all or partial samples within a current block, and the block may be at least one of a CTU, a CU, a PU, and a TU.

According to an embodiment of the present invention, a filtering target sample may be a sample of a certain sub-block within a current block. Herein, the certain sub-block may be a pre-defined sub-block.

According to an embodiment of the present invention, a filtering target sample may be an intra-prediction sample, and a target sample may be determined on the basis of at least one of an intra-prediction mode of a current block, a size/shape of the current block, and a reference sample line.

In an example, when the intra-prediction mode is a non-directional mode such as DC or Planar mode, a predetermined prediction sample line adjacent to a reference sample may be determined as a target sample.

In another example, a target sample may be determined as a prediction sample line according to a direction of the intra-prediction mode. When the intra-prediction mode is a vertical directional mode, a predetermined prediction sample line adjacent to a left reference sample may be determined as a target sample. In addition, when the intra-prediction mode is a horizontal directional mode, a predetermined prediction sample line adjacent to an upper reference sample may be determined as a target sample.

In another example, when a size of a current block is 4×4, a predetermined prediction sample line may be determined as a target sample, and more prediction sample lines may be determined as a target sample when a size of the block becomes great.

In another example, when a current block has a horizontally long shape, a predetermined prediction sample line adjacent to an upper reference sample may be determined as a target sample. In addition, when the current block has a vertically long shape, a predetermined prediction sample line adjacent to a left reference sample may be determined as a target sample.

In another example, when a reference sample line used for prediction is the first line adjacent to a current block, a predetermined prediction sample line may be determined as a target sample. Meanwhile, when the reference sample line is the second or more line, a prediction sample may not be determined as a filtering target sample.

Hereinafter, determining whether or not to apply filtering will be described.

In determining whether or not to apply filtering, whether or not to apply filtering to a filtering target sample may be determined. Whether or not to apply filtering may be determined on the basis of at least one of a coding mode, an intra-prediction mode, an inter-prediction mode, transform information, filtering information, a size (horizontal or vertical size), a shape, and a reference sample line of a current block, and a coding mode, an intra-prediction mode, an inter-prediction mode, transform information, filtering information, a size (horizontal or vertical size), a shape, and a reference sample line of a neighbor block. Alternatively, whether or not to apply filtering may be determined on the basis of at least one coding parameter. Alternatively, an indicator indicating whether or not to apply filtering may be signaled through at least one of a SPS, a PPS, and a slice header.

According to an embodiment of the present invention, whether or not to apply filtering may be determined on the basis of a coding mode of a current block. For example, when the coding mode is an intra mode, filtering may be determined to be applied to the current block, and when the coding mode is an inter mode, filtering may be determined not to be applied to the current block.

According to an embodiment of the present invention, whether or not to apply filtering may be determined on the basis of an intra-prediction mode of a current block. For example, when the intra-prediction mode of the current block corresponds to a predetermined mode, filtering may be determined to be applied. The predetermined mode may be, as an example of FIG. 4, at least one of a Planar mode, a DC mode, a horizontal mode, a vertical mode, a 45/135/225 angular mode, and an arbitrary angular mode.

In an example, whether or not to apply filtering may be determined according to whether or not the intra-prediction mode or a mode number is an even or odd number. For example, when the intra-prediction mode has an odd numbered value, filtering may be applied, and when the intra-prediction mode has an even numbered value, filtering may not be applied. When determining whether or not the intra-prediction mode is an odd or even numbered value, a modular arithmetic may be used.

In another example, whether or not to apply filtering may be determined according whether or not an intra-prediction mode corresponds to a predetermined range. For example, when the intra-prediction mode is greater than a predetermined mode, filtering may be determined to be applied. On the contrary, when the intra-prediction mode is smaller than a predetermined mode, filtering may be determined to be applied. In addition, for example, when the intra-prediction mode is equal to or greater than a predetermined mode, filtering may be applied. Herein, the predetermined mode may be a mode 58. In addition, for example, filtering may be determined to be applied when the intra-prediction mode is equal to or smaller than a predetermined mode. Herein, the predetermined mode may be a mode 10.

Meanwhile, a filtering target sample may be a prediction sample when performing intra or inter-prediction.

In another example, filtering may be applied to a mode corresponding to a predetermined range based on an intra-prediction mode. For example, filtering may be applied to a mode increased by or decreased by +N or −N from the intra-prediction mode, and N may be an integer equal to or greater than 1. For example, when the intra-prediction mode is a vertical mode and N is 2, filtering may be applied to a mode increased by or decreased by 2 from the vertical mode.

In another example, whether or not to apply filtering may be determined according to whether an intra-prediction mode is a non-directional mode (Planar mode, DC mode) or a directional mode (mode other than Planar mode and DC mode). For example, filtering may be applied when the intra-prediction mode is a directional mode. Otherwise, filtering may not be applied when the intra-prediction mode is a non-directional mode.

According to an embodiment of the present invention, whether or not to apply filtering may be determined on the basis of an inter-prediction mode of a current block. For example, when the inter-prediction mode of the current block corresponds to a predetermined mode, filtering may be determined to be applied.

In an example, when an inter-prediction mode is an inter-prediction mode other than a skip mode, filtering may be applied.

In another example, when an inter-prediction mode corresponds to a merge mode, filtering may be applied.

In another example, when an inter-prediction mode is a mode performing prediction or motion compensation using at least two blocks, filtering may be applied. For example, when prediction is performed by combining a single merge mode and a single intra-prediction mode, filtering may be applied. Herein, a filtering target sample may be a reference sample used for performing intra-prediction, or a predicted prediction sample.

Alternatively, on the contrary, in order to reduce complexity, when prediction is performed by combining a single merge mode and a single intra-prediction mode, filtering may not be applied. For example, when the merge mode and the intra-prediction mode are combined, filtering may not be applied to a reference sample for intra-prediction or to a prediction sample.

According to an embodiment of the present invention, whether or not to apply filtering may be determined on the basis of a size of a current block (horizontal or vertical size of the current block).

In an example, when a horizontal or vertical size corresponds to a predetermined range, filtering may be applied. For example, when a size of a current block is equal to or greater than 8×8 and equal to or smaller than 32×32, filtering may be applied. Alternatively, for example, when a size of a block is equal to or smaller than 32×32, filtering may be applied. Herein, information corresponding to the predetermined range may be signaled or predefined.

In another example, when a statistical value of horizontal and vertical sizes corresponds to a predetermined range, filtering may be applied. For example, when the sum of horizontal and vertical sizes is equal to or greater than 16 and equal to or smaller than 64, filtering may be applied. Herein, the statistical value may be any one of a sum, product, weighted sum, or average value.

In another example, when a size of a current block is smaller than 64×64, filtering may be applied. The size of the current block may be represented as an average log value of horizontal and vertical lengths, for example (Log 2 (horizontal length)+Log 2 (vertical length))>>1. When the size is 64×64, it may be 6. In other words, when an average log value of horizontal and vertical lengths is smaller than 6, the filtering may be applied.

In another example, when the product of a horizontal size and a vertical size of a current block is greater than a predetermined threshold value, filtering may be applied. The predetermined threshold value may be, for example, 32.

According to an embodiment of the present invention, whether or not to apply filtering may be determined on the basis of a shape of a current block.

In an example, when a shape of a current block is a square, filtering may not be applied, and when the shape is a non-square, filtering may be applied.

In another example, whether or not to apply filtering may be determined on the basis of an intra-prediction mode of a current block and a shape of the current block. For example, when the intra-prediction mode of the current block is a predetermined mode, and a shape of the current block is a non-square, filtering may be applied.

The predetermined mode may be, for example, a predetermined directional mode. For example, the predetermined mode may be a diagonal directional prediction mode (for example, left-lower diagonal directional mode or right-upper diagonal directional mode). Alternatively, the predetermined mode may be a mode obtained by adding a predetermined constant value to the diagonal directional prediction mode. The predetermined constant value may be an integer.

For example, when an intra-prediction mode of a current block is 2 and a vertical size of the current block is equal to or greater than a horizontal size of the current block, filtering may be applied.

In addition, when an intra-prediction mode of a current block is 66 and a horizontal size of the current block is equal to or greater than a vertical size of the current block, filtering may be applied.

A non-square shape may be determined by comparing horizontal and vertical sizes of a block. In addition, the non-square shape may be determined on the basis of a shape of a neighbor block.

Meanwhile, a filtering target sample may be a reference sample adjacent to a current block used for prediction, or a reference sample included in a reference picture used for prediction.

According to an embodiment of the present invention, whether or not to apply filtering may be determined on the basis of transform information of a current block. The transform information may be at least one of a coded block flag (CBF), an explicit multiple core transform (EMT) flag, a non-separable secondary transform (NSST) index, a transform skip flag, and multiple transform selection (MTS).

In an example, when a CBF is 1, filtering may be determined to be applied, and when the CBF is 0, filtering may be determined not to be applied.

In another example, when an NSST index is 0, filtering may be determined not to be applied, and when the NSST index is other than 0, filtering may be determined to be applied.

In another example, when a transform skip flag is 1, filtering may be determined not to be applied, and when the transform skip flag is 0, filtering may be determined to be applied.

In another example, when MTS is applied to a current block, filtering may not be applied. In other words, when cu_mts_flag is 1, filtering may be determined not to be applied, and when cu_mts_flag is 0, filtering may be determined to be applied.

In another example, filtering may not be applied in a specific mode of MTS. For example, filtering may not be applied when mts_idx is 1 to 3.

According to an embodiment of the present invention, whether or not to apply second filtering may be determined on the basis of first filtering information of a current block. The first filtering or second filtering may be at least one of a reference sample filter, a prediction sample filter, a residue sample filter, a reconstructed sample filter (for example, bilateral filter), a deblocking filter, an SAO, and an ALF. The filtering information may be at least one of whether or not to apply filtering, and a filter type.

In an example, when first filtering is not applied to a current block, second filtering may not be applied. On the contrary, when the first filtering is not applied, the second filtering may be applied.

In another example, when first filtering is applied to a reconstructed block including a reference sample of a current block, second filtering may not be applied to the reference sample.

According to an embodiment of the present invention, whether or not to apply filtering may be determined on the basis of whether or not a current block has a constrained intra prediction (CIP) mode.

For example, when a current block is encoded/decoded in a CIP mode and a neighbor block adjacent to the current block has an inter mode, at least one of a bilateral filter, deblocking filter, an SAO, and an ALF may be determined not to be applied to a sample within the current block. Accordingly, an error occurring in an inter encoding/decoding block may not be spread.

According to an embodiment of the present invention, an indicator indicating whether or not to apply filtering may be signaled through at least one of a SPS, a PPS, and a slice header. In addition, when a block is divided by a sub-block unit, whether or not to apply filtering to the sub-block may be determined according to an indicator indicating whether or not to apply filtering to an upper level block of the sub-block.

According to an embodiment of the present invention, whether or not to apply filtering to a prediction sample may be determined on the basis of a reference sample line used for intra-prediction of a current block. For example, when the reference sample line used for the prediction corresponds to a first reference sample line (for example, mrl_idx=0), filtering to a prediction sample may be applied on the basis of the intra-prediction mode or size/shape of a block or both. Meanwhile, when the reference sample line used for prediction corresponds to at least one of second to fourth reference sample lines (for example, mrl_idx !=0), filtering may not be applied to the prediction sample. The mrl_idx may mean a reference sample line index adjacent to a current block, and a value of mrl_idx may increase when the same becomes far away from the current block. In other words, when mrl_idx=0, it may mean a reference sample line that is closest to the current block among reference sample lines used for intra-prediction of the current block.

In addition, for example, when a reference sample line used for performing prediction corresponds to a first reference sample line (for example, mrl_idx=0) and an intra-prediction mode of a current block has a mode corresponding to one of a Planar mode, a DC mode, a horizontal mode, a vertical mode, and a predetermined range, filtering to a prediction sample may be applied. For example, the predetermined range may mean a case where the intra-prediction mode of the current block is equal to or greater than a predetermined mode (for example, mode 58), or a case where the intra-prediction mode of the current block is equal to or smaller than a predetermined mode (for example, mode 10).

Meanwhile, a filtering target sample may be a prediction sample when performing intra or inter-prediction.

Hereinafter, determining and applying a filter type will be described.

In determining and applying a filter type, when filtering is determined to be applied to a filtering apply target sample, at least one filter type (or filter type) may be determined and applied. The filter type may be at least one of a filter tap, a filter shape, and a filter coefficient. A plurality of sample lines of an adjacent block may be used when applying the filter.

According to an embodiment of the present invention, a filter type may be at least one of the following.

In an example, a filter type may be an N-tap filter using a filtering target sample and at least one adjacent sample. Herein, N may be an integer equal to or greater than 2.

In another example, a filter type may be a form of adding an offset value to a filtering target sample. Alternatively, the filter type may be a form of performing weighted sum for the filtering target sample and a predetermined sample.

In another example, a filter shape may be at least one of horizontal, vertical, diagonal, and cross shapes.

In another example, a filter coefficient may be a positive or negative integer, and may have a value varying according to a number of filter taps, and a shape.

According to an embodiment of the present invention, filtering may be applied to at least one reference sample when generating a reference sample used for intra-prediction.

Filtering may be applied to a plurality of reference sample lines. Herein, an applied filter type may be at least one filter type.

In an example, the same filter may be applied to each line of a plurality of reference sample lines.

In another example, a first filter may be applied to a first reference sample line, and a second filter may be applied to a second reference sample line. For example, the first filter may be a 5-tap filter and the second filter may be a 3-tap filter.

In another example, a first filter may be applied to a first reference sample line, and a second filter may not be applied to a second reference sample line.

In another example, a first filter may be applied to a first reference sample line, and then a second filter may be applied thereto.

The first filter and the second filter may be identical or different.

Meanwhile, filtering to a reference sample may not be always applied. Accordingly, generating the reference sample may become simple, and decoding and the decoder may become simple.

Filtering may be applied to a reference sample on the basis of combined prediction information of inter-prediction and intra-prediction (for example, MH_infra_flag).

In an example, when combined prediction is performed (for example, MH_intra_flag=1), filtering may not be applied to a reference sample.

In another example, when combined prediction is not performed (for example, MH_infra_flag=0), filtering may not be applied to a reference sample.

According to an embodiment of the present invention, when performing inter-prediction, filtering may be applied to a reference picture sample.

In an example, when performing motion prediction or compensation for a current block, filtering may be applied to a sample or block of a reference picture corresponding to motion information.

In another example, when a current block is divided by a sub-block unit and motion compensation is performed in the sub-block unit, filtering may be applied to a reference block sample of a picture that is referenced by the sub-block. Herein, filter may be applied to a sample adjacent to a boundary of each reference block.

Meanwhile, when performing prediction based on at least one intra-prediction mode, filtering may be applied to a prediction sample. A filtering applying target sample may be all samples within a current block or partial samples adjacent to a reference sample.

According to an embodiment of the present invention, when performing DC prediction, filtering may be applied to all prediction samples within a current block or to a predetermined prediction sample line adjacent to a boundary of a block adjacent to an upper reference sample and a left reference sample. The predetermined prediction sample line may be determined to vary according to a size of the current block. For example, when a size of the current block becomes larger, more lines may be selected.

Figure 7:
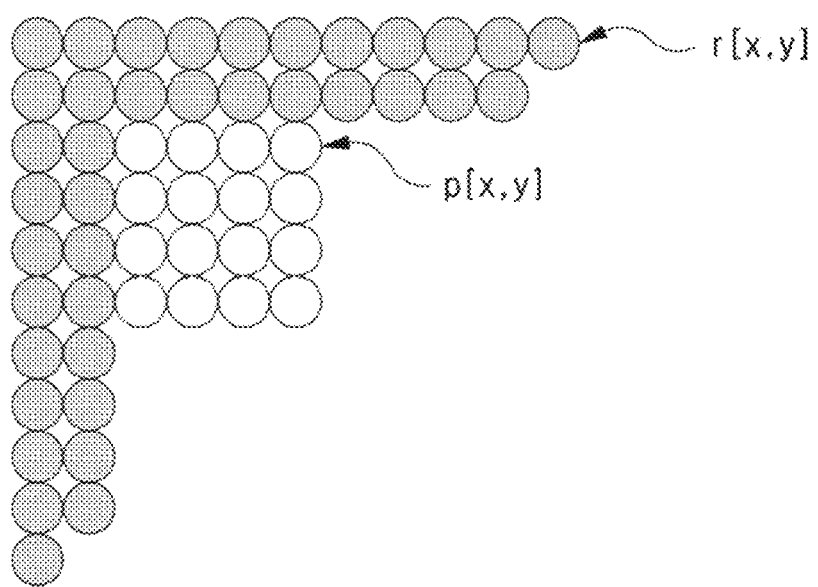
FIG. 7 is a view showing filtering using variation of a plurality of reference sample lines according to an embodiment of the present invention.

FIG. 7 is a view showing filtering using variation of a plurality of reference sample lines according to an embodiment of the present invention.

Referring to FIG. 7, in an example, a value corresponding at a predetermined rate of a difference value between a first reference sample line and a second reference sample line may be applied to a prediction sample.

For example, it may be represented as Formula 1.

$$pf[x,0]=\mathrm{clip}(p[x,0]+((r[x,-1]-r[x,-2])>>N)) \qquad \text{[Formula 1]}$$

In Formula 1, pf[x, 0] may mean a sample value obtained by applying filtering, p[x, 0] may mean the prediction sample value, r[x, −1] may mean a first reference sample value, r[x, −2] may mean a second reference sample value, N is an integer equal to greater than 1, and clip may mean clipping taking account into a bit depth. Herein, N may increase or decrease when x or y of the prediction sample increases.

In another example, an N-tap filter may be applied by using a plurality of reference sample lines. For example, a 3-tap filter may be applied as Formula 2 or Formula 3.

$$pf[x,0]=(r[x,-2]+2*r[x,-1]+5*p[x,0]+4)>>3 \qquad \text{[Formula 2]}$$

$$pf[x,0]=(r[x,-2]+r[x,-1]+2*p[x,0]+2)>>2 \qquad \text{[Formula 3]}$$

In another example, an N-tap filter may be applied by using at least one reference sample of the first reference sample line. For example, a 4-tap filter may be applied as Formula 4.

$$pf[x,y]=(A*r[-1,-1]+B*r[x,-1]+C*r[-1,y]+(64-A-B-C)*p[x,y]+32)>>6 \qquad \text{[Formula 4]}$$

In Formula 4, A, B, and C may be a filter coefficient applied to each reference sample.

The at least one filter coefficient may vary according to at least one of a location of a prediction sample, and an intra-prediction mode of a current block.

For example, a filter coefficient value may become small when a location of the prediction sample becomes far away from a left or upper reference sample.

In addition, at least one filter coefficient may become 0 according to a location of a prediction sample. In other words, a number of filter taps may vary on the basis of a location of a prediction sample.

In addition, when a location of a prediction sample becomes far away by a predetermined location from a left reference sample, C may become 0. Accordingly, herein, a number of filter taps may become 3-tap or 2-tap. Herein, a location of the prediction sample may mean an x location of the prediction sample.

In addition, when a location of a prediction sample becomes far away by a predetermined location from an upper reference sample, B may become 0. Accordingly, herein, a number of filter taps may be 3-tap or 2-tap. Herein, a location of the prediction sample may mean a y location of the prediction sample.

In addition, when a location of a prediction sample becomes far away by a predetermined location from both left and upper reference samples, a filter may not be applied. Accordingly, all of A, B, and C may become 0. Herein, a location of the prediction sample may mean an x or y or both locations of the prediction sample.

In addition, at least one filter coefficient may vary based on whether an intra-prediction mode of a current block is a non-directional mode, a vertical direction mode, a horizontal direction mode, a diagonal direction mode, or other directional mode.

Varying of a filter coefficient or a number of taps or both according to a location of a prediction sample may be identically applied to filtering based on at least one intra-prediction mode which will be described later.

According to an embodiment of the present invention, when performing Planar prediction, filtering may be applied to all prediction samples or partial prediction samples within a current block.

In an example, when performing Planar prediction, Planar prediction may be performed by using a reference sample to which filtering is not applied. Herein, when generating a prediction sample, filtering may be applied to the prediction sample by using the reference sample.

In another example, a reference sample used for Planar prediction and a reference sample used when applying a first filter to a prediction sample may be different from each other. For example, the reference sample used for Planar prediction may be a sample to which a second filter is applied, and the reference sample used when applying the first filter to the prediction sample may be a sampled to which the second filter is not applied.

Meanwhile, filtering to a prediction sample may be applied on the basis of a statistical value of a reference sample. For example, when a statistical value of a reference sample satisfies a predetermined threshold value, filter may be applied to the prediction sample, otherwise, filter may not be applied.

According to an embodiment of the present invention, when performing horizontal or vertical prediction, filtering may be applied when generating a prediction sample.

In an example, when performing vertical prediction, filtering may be performed by using variation of a plurality of upper reference sample lines. For example, it may be represented as Formula 5, and N may be a fixed value equal to or greater than 1. Alternatively, N may be y+1 or (H−y), and H may represent a vertical size of a block.

$$pf[x,y]=\text{clip}(p[x,y]+((r[x,-1]-r[x,-2])>>N)) \quad \text{[Formula 5]}$$

In another example, when performing vertical prediction, filtering may be performed by using variation of an upper reference sample and a left reference sample. For example, it may be represented as Formula 6.

$$pf[x,y]=\text{clip}(p[x,y]+((r[x,-1]-r[-1,-1])>>N)+((i[-1,y]-r[-1,-1])>>M)) \quad \text{[Formula 6]}$$

In Formula 6, N or M may be a fixed value equal to or greater than 1. Alternatively, N may increase or decrease when x increases. M may increase or decrease when y increases.

In another example, when performing vertical prediction, filtering may be performed by using a reference sample present at the left of a filtering target sample. For example, it may be represented as Formula 7 or Formula 8.

$$pf[x,y]=\text{clip}(p[x,y]+((r[-1,y]-r[-1,-1])>>N)) \quad \text{[Formula 7]}$$

$$pf[x,y]=((64-A)*p[x,y]+A*(r[-1,y]-r[-1,-1])+32)>>6 \quad \text{[Formula 8]}$$

In Formula 7 or Formula 8, filtering to p[x, y] may be applied by using a difference value between r[−1, 1] and r[−1, y]. Herein, N may be (x+1). In addition, A may be a filter coefficient based on an x value, and effect of not applying filtering may be obtained since a filtering target prediction sample becomes far away by a predetermined distance from a left reference sample, and thus the filter coefficient becomes 0.

In another example, filtering may be applied to a reference sample present at the left of a filtering target sample, and then filtering to a target sample may be applied. For example, it may be represented as Formula 9.

$$pf[x,y]=\text{clip}(p[x,y]+((((r[-1,y-1]+2*r[-1,y]+r[-1,y+1]+2)>>2)-r[-1,-1])>>N)) \quad \text{[Formula 9]}$$

An embodiment of vertical prediction described above may be identically applied to horizontal prediction.

According to an embodiment of the present invention, when performing directional prediction having a predetermined angle, filtering may be applied to all prediction samples or partial prediction samples within a current block.

In an example, when performing prediction by using an upper reference sample, a plurality of left reference sample lines may be used. For example, it may be represented as Formula 10.

$$pf[0,y]=(r[-2,y+2]+2*r[-1,y+1]+5*p[0,y]+4)>>3 \quad \text{[Formula 10]}$$

A number of left reference sample lines may vary according to a location of a prediction sample. For example, when the prediction sample is located at the first left line, two reference sample lines may be used, and when the prediction sample is located at the second left line, one reference sample line may be used.

In another example, filtering may be performed by using at least one reference sample present on a directional line. For example, an upper reference sample r[x', −1] and a left reference sample r[−1, y'] which are present at a directional line may be used. x' and y' values may represent a location of a reference sample based on an angle according to each directional mode. In addition, r[x', y] (y<0) may be used rather than the r[x', −1], and r[x, y'] (x<0) may be used rather than the r[−1, y'].

An upper reference sample or left reference sample or both may be derived by applying an interpolation filter. In addition, when a directional prediction mode of a current block satisfies a predetermined condition, the upper reference sample or left reference sample or both may be determined by using a sample at an integer location adjacent to a directional line of the directional prediction mode. The predetermined condition may be a direction of a prediction mode or a number of the prediction mode.

When a directional prediction mode is a mode corresponding to 45 degrees to 90 degrees (for example, mode 63), a prediction sample p[x, y] may be generated through interpolation of the upper reference sample r[x', −1] and at least one adjacent reference sample.

When performing filtering to a prediction sample, it may be represented as Formula 11.

$$pf[x,y]=(A*r[-1,y']+(64-A)*p[x,y]+32)>>6,\quad\text{[Formula 11]}$$

In Formula 11, a left reference sample r[−1, y'] may be used, and the left reference sample may be derived by applying an interpolation filter. For example, a bilinear interpolation filter may be applied as Formula 12.

$$r[-1,y']=((64-\text{Frac})*r[-1,y']+\text{Frac}*r[-1,y'+1]+32)>>6\quad\text{[Formula 12]}$$

Herein, Frac may be a value of a 1/64-pel unit between two samples. For example, Frac may be a distance value in a 1/64-pel unit between two samples.

Alternatively, a left reference sample may decrease in complexity by using a sample at an integer location close to a directional line as Formula 13. The sample at the integer location may be a sample at an integer location closest to a directional line of a directional prediction mode among samples of a vertical directional line at which the left reference sample is located.

$$r[-1,y']=r[-1,y'+(\text{Frac}>>5)]\quad\text{[Formula 13]}$$

For example, when a directional prediction mode is equal to or greater than a mode 58 and smaller than a mode 66, a left reference sample may use a sample at an integer location close to a directional line of the directional prediction mode.

In addition, when a directional mode of a horizontal direction, for example, the directional prediction mode, is a mode corresponding to 3 to 17, prediction may be performed by using at least one left reference sample.

In addition, filtering to a prediction sample may be performed by using an upper reference sample, and the upper reference sample may be a sample at an integer location close to a directional line. For example, the upper reference sample may be derived as Formula 14. The sample at an integer location may be a sample at an integer location closest to a directional line of the directional prediction mode among samples of the horizontal directional lined at which the upper reference sample is located.

$$r[x',-1]=r[x'+(\text{Frac}>>5),-1]\quad\text{[Formula 14]}$$

In addition, for example, when a directional prediction mode is equal to or smaller than a mode 10 and greater than a mode 2, an upper reference sample may use a sample at an integer location close to a directional line of the directional prediction mode.

According to an embodiment of the present invention, filtering may be applied to a sample that is predicted using a first intra-prediction mode by using a value predicted using a second intra-prediction mode.

In an example, a first intra-prediction mode may be a DC mode, and a second intra-prediction mode may be a predetermined directional mode. Herein, filtering may be applied through performing weighted sum for a sample predicted using the DC mode, and a sample predicted using the predetermined directional mode.

In another example, filtering may be applied through performing weighted sum for a first intra-prediction sample and a second intra-prediction sample.

According to an embodiment of the present invention, a reference sample used for intra-prediction and a reference sample used for applying filtering may be different from each other.

In an example, a reference sample used for prediction may be a reference sample to which filtering is applied while generating the reference sample, and the reference sample used for applying filtering to a prediction sample may be a reference sample to which filtering is not applied while generating the reference sample.

In another example, a reference sample used for prediction may be a plurality of reference sample lines, and a reference sample used for applying filtering may be a single reference sample line.

In another example, a reference sample used for prediction may be a first reference sample line adjacent to a current block, and a reference sample used for applying filtering may be a second reference sample line adjacent to the current block.

According to an embodiment of the present invention, when applying filtering to a prediction sample, at least one of a filter coefficient, a filter tap, a filter shape, and a weight may be variably applied according to at least one of a prediction sample line within a current block, a prediction mode of the current block, and a size of the current block.

In an example, a 2-tap filter may be applied to a first prediction sample line adjacent to a boundary of a reference sample, and a 3-tap filter may be applied to a second prediction sample line. Alternatively, a number of filter taps may decrease when the prediction sample line becomes far away from the reference sample.

In another example, a filter coefficient value in association with a second prediction sample line may be smaller than a filter coefficient value in association with a first prediction sample line. In other words, a filter coefficient value in association with each line may become small when a prediction sample line becomes far away from a reference sample. In other words, a filter coefficient value applied to a left reference sample may become small when the prediction sample line becomes far away from the left reference sample. Similarly, a filter coefficient value applied to an upper reference sample may become small when the prediction sample line becomes far away from the reference sample.

Herein, a filter coefficient value in association with a sample line may be a filter coefficient value applied to a reference sample or prediction sample line.

A sum of the filter coefficient values may be pre-defined value. For example, the sum of the filter coefficient values may be 8. In addition, the filter coefficient value may vary according to a distance between a prediction sample and a reference sample. For example, when a prediction sample becomes far away from a reference sample, a filter coefficient value applied to a prediction sample or reference sample may become small. Alternatively, on the contrary, when the prediction sample becomes far away from the reference sample, the filter coefficient value applied to the prediction sample or reference sample may become large. In addition, the filter coefficient value may vary according to horizontal or vertical or both sizes of a current block.

Meanwhile, filtering may be applied through performing weighted sum for an intra-prediction sample of a current block and an inter-prediction sample of the current block.

A weight may mean a filter coefficient value.

In an example, when an intra-prediction mode of a current block satisfies a predetermined condition, a weight applied to the intra-prediction sample and a weight applied to an inter-prediction sample may differ.

In another example, when an intra-prediction mode of a current block is a non-directional mode (DC mode or Planar mode), a fixed value may be applied to a weight applied to an intra-prediction sample and an inter-prediction sample. For example, the fixed value may be 4.

In another example, when an intra-prediction mode of a current block is a directional mode, a weight may be variably applied to an intra-prediction sample and an inter-prediction sample.

In another example, when an intra-prediction mode of a current block has a vertical direction (prediction mode 50), a weight may be variably applied to an intra-prediction sample and an inter-prediction sample according to a y location of a prediction sample. Herein, a weight applied to the intra-prediction sample may become small when a prediction sample becomes far away from the reference sample. In addition, a weight applied to the inter-prediction sample may become large when the prediction sample becomes far away from a reference sample. In addition, the weight may vary according to a vertical size of the current block.

In another example, when an intra-prediction mode of a current block has a horizontal direction (prediction mode 18), a weight applied to an intra-prediction sample and an inter-prediction sample may be variably applied according to an x location of a prediction sample. Herein, a weight applied to the intra-prediction sample may become small when the prediction sample becomes far away from a reference sample. In addition, a weight applied to the inter-prediction sample may become large when the prediction sample becomes far away from the reference sample. In addition, the weight may vary according to a horizontal size of the current block.

In another example, when an intra-prediction mode of a current block is not a non-directional mode, a vertical direction mode, nor a horizontal direction mode, a fixed value may be applied to a weight applied to an intra-prediction sample and an inter-prediction sample. For example, the fixed value may be 4.

According to an embodiment of the present invention, when performing prediction on the basis of at least one intra-prediction mode, filtering may be applied to a prediction sample. A filtering applying target sample may be all samples within a current block or partial samples adjacent to a reference sample.

According to an embodiment of the present invention, filtering may be applied to a sample predicted on the basis of at least one inter-prediction mode.

In an example, when an inter-prediction mode of a current block is not a skip mode, filtering may be applied to an inter-prediction sample of the current block.

In another example, when an inter-prediction mode of a current block is a merge mode, filtering may be applied to an inter-prediction sample of the current block.

Filtering may have a shape of a weighted sum of at least one prediction sample. For example, filtering may be performed through performing a weighted sum for a prediction value of a first inter mode and a prediction value of a second inter mode. Alternatively, filtering may be performed through performing weighted sum for a prediction value of an inter mode and a prediction value of an intra mode. The prediction value of the inter mode may be a value predicted by using a merge mode.

In addition, filtering may be applied to all or partial prediction samples of a current block. For example, filtering may be applied to a predetermined sample at a boundary of the current block.

In another example, when inter-prediction is performed by diving a current block into predetermined sub-blocks, filtering may be applied may be applied to all sub-blocks or to partial samples such as boundary. For example, the current block may be divided into two sub-blocks, filtering may be applied to prediction samples located at a boundary of a first sub-block and a second sub-block. Filtering may have a shape of a weighted sum of prediction values of the first sub-block and the second sub-block. In addition, for example, filtering may not be applied to a prediction sample located at a boundary of the first sub-block and the second sub-block.

According to an embodiment of the present invention, filtering may be applied to a residue sample of a current block. The residue sample may be a sample corresponding to at least one of before, after, and during transform and quantization of the current block. For example, a filter may be applied to a residue sample obtained by performing entropy decoding for a residue signal of the current block, and then performing dequantization and inverse-transform for the same.

According to an embodiment of the present invention, at least one filter may be applied to a reconstructed sample of a current block. The reconstructed sample may be a sample generated by adding a prediction sample and a residue sample. Alternatively, the reconstructed sample may be a sample to which at least one of a bilateral filter, a deblocking filter, a sample adaptive offset (SAO), and an adaptive loop filter (ALF) is applied.

Filtering may be applied to a reconstructed sample generated by adding a prediction sample and a residue sample of a current block.

In an example, a bilateral filter may be applied by using a filtering target sample of a reconstructed sample, and a neighbor sample. A sample to which the filter is applied may be used as a reference sample of a block that follows in a decoding order. The bilateral filter may be a filter using a distance between a filtering target sample and a neighbor sample, and a value of each sample.

In another example, a deblocking filter may be applied to a reconstructed sample. Alternatively, a deblocking filter may be applied to a reconstructed sample to which a bilateral filter is applied.

Meanwhile, when applying a deblocking filter, the filter may be applied on the basis of a size/shape of a block. For example, when applying a filter to a vertical boundary, a number of samples applied and used for the filter may be determined on the basis of a size/shape of a left block. Similarly, a number of samples used and applied to a filter may be determined on the basis of a size/shape of a right block.

In another example, an SAO or ALF may be applied to a reconstructed sample to which a deblocking filter is applied. The SAO may be applying an offset to a filtering target sample, and the ALF may be a two-dimensional filter using a filtering target sample and a neighbor sample.

Meanwhile, a filter may be selectively applied, and may be applied in a predetermined order. For example, a bilateral filter, a deblocking filter, and an SAO may be sequentially applied. Alternatively, a bilateral filter, an SAO, and an ALF may be sequentially applied. Alternatively, a bilateral filter, an SAO, a deblocking filter, and an ALF may be sequentially applied. Herein, information of the predetermined order may be determined in the encoder and signaled in the decoder.

A reconstructed sample may be a sample generated by performing motion compensation. In addition, the reconstructed sample may be a reconstructed sample of a neighbor block adjacent to a current block.

In another example, filtering may be performed for a reconstructed sample of a current block and a reconstructed sample of a neighbor block.

In another example, filtering may be applied on the basis of transform information of a current block. For example, when transform is skipped for the current block, the at least one filtering may not be applied.

According to an embodiment of the present invention, when applying a filter, whether or not to apply filtering to a reference sample, a prediction sample, and a reconstructed sample may be determined, and applying a filter may be performed.

Figure 8:
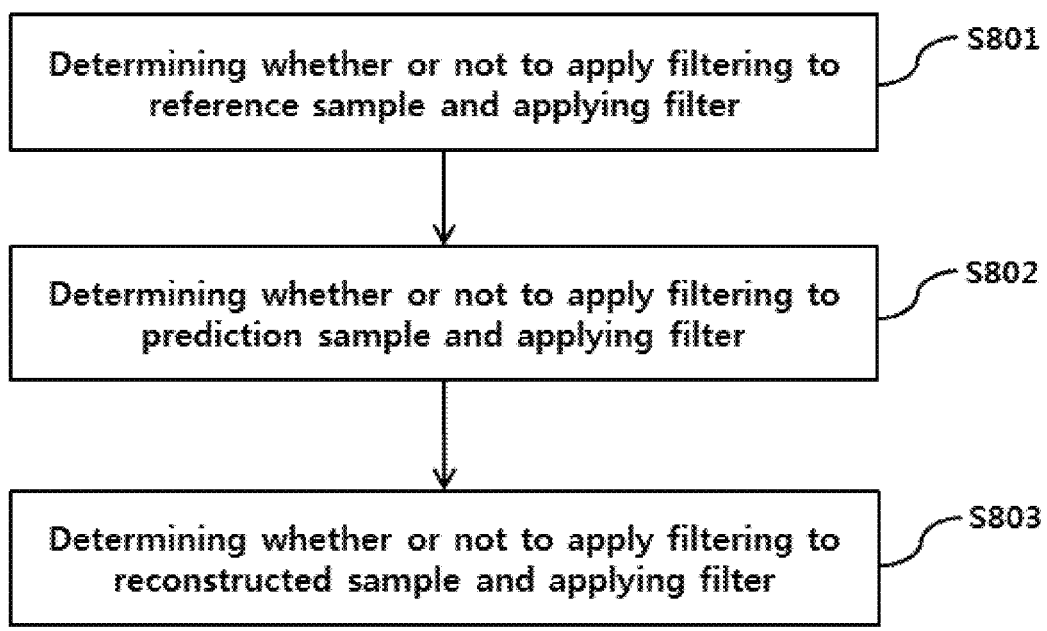
FIG. 8 is a view showing determining whether or not to apply filtering to a reference sample, a prediction sample, and a reconstructed sample, and applying a filter thereto according to an embodiment of the present invention.

FIG. 8 is a view showing determining whether or not to apply filtering to a reference sample, a prediction sample, and a reconstructed sample, and applying a filter according to an embodiment of the present invention.

The encoder/decoder may perform at least one of determining, in S801, whether or not to apply filtering to a reference sample, and applying a filter, determining, in S802, whether or not to apply filtering to a prediction sample, and applying a filter, and determining, in S803, whether or not to apply filtering to a reconstructed sample, and applying a filter. An order of performing each step may vary, and a part of the steps may be performed.

Herein, the filter may be a first, a second, or a third filter, and another filter may be applied on the basis of filter information. For example, a second filter may be adaptively applied on the basis of at least one of whether or not a first filter is applied, and a filter type.

In an example, when a first filter is applied to a current block, a second filter may not be applied. Alternatively, on the contrary, when the first filter is applied, the second filter may be determined to be applied.

In another example, when filtering is applied to a reference sample of a current block, filtering may not be applied to a prediction sample.

In another example, when filtering is not applied to a reference sample of a current block, filtering may be applied to a prediction sample.

In another example, when filtering is applied to a reference sample of a current block, a first filter type may be applied to a prediction sample. Alternatively, when filtering is not applied to the reference sample, a second filter type may be applied to the prediction sample.

In another example, when a bilateral filter is applied to a reconstructed sample of a first block, a filter may not be applied to a reference sample used for predicting a second block. The reference sample may be a reconstructed sample of the first block to which the bilateral filter is applied.

Figure 9:
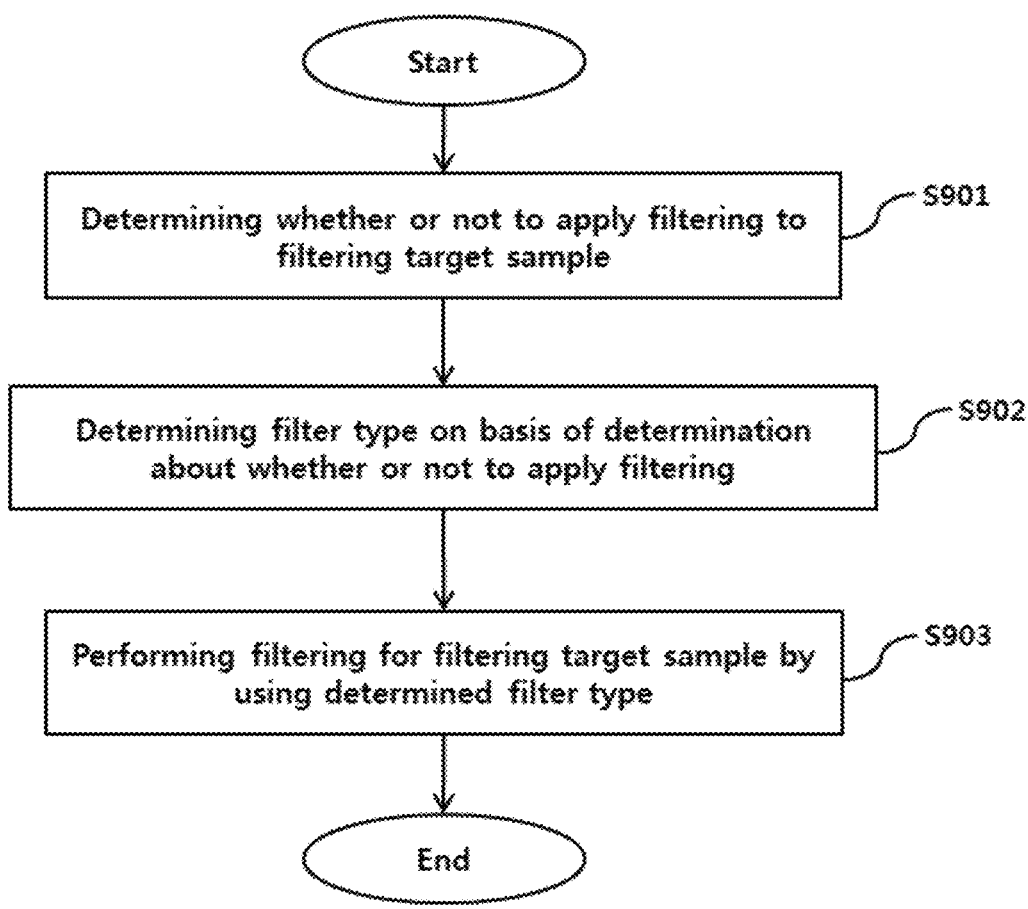
FIG. 9 is a view of a flowchart showing an image encoding method according to an embodiment of the present invention.

FIG. 9 is a view of a flowchart showing an image encoding method according to an embodiment of the present invention.

Referring to FIG. 9, in S901, the encoder may determine whether or not to apply filtering to a filtering target sample.

The filtering target sample may include at least one of a prediction sample, a reference sample, a reconstructed sample, and a residue sample.

Meanwhile, whether or not to apply filtering may be determined on the basis of at least one of a coding mode, an intra-prediction mode, an inter-prediction mode, transform information, filtering information, a size (horizontal or vertical size), a shape, and a reference sample line of a current block, and a coding mode, an intra-prediction mode, an inter-prediction mode, transform information, filtering information, a size (horizontal or vertical size), a shape, and a reference sample line of a neighbor block.

Meanwhile, whether or not to apply filtering may be determined based on whether or not a shape of the current block is a non-square shape.

Meanwhile, whether or not to apply the filtering may be determined on the basis of whether or not an intra-prediction mode of the current block is a predetermined directional mode.

In addition, in S902, the encoder may determine a filter type on the basis of the result of whether or not to apply the filtering.

Meanwhile, the filter type may include at least one of a filter tap, a filter shape, and a filter coefficient.

Meanwhile, when it is determined to apply filtering to the filtering target sample, the filter type may be determined.

Meanwhile, the filter type may be determined on the basis of a location of the filtering target sample.

Meanwhile, the filter type may be determined on the basis of at least one of a size and a prediction mode of the current block.

In addition, in S903, the encoder may perform filtering for the filtering target sample by using the determined filter type.

Figure 10:
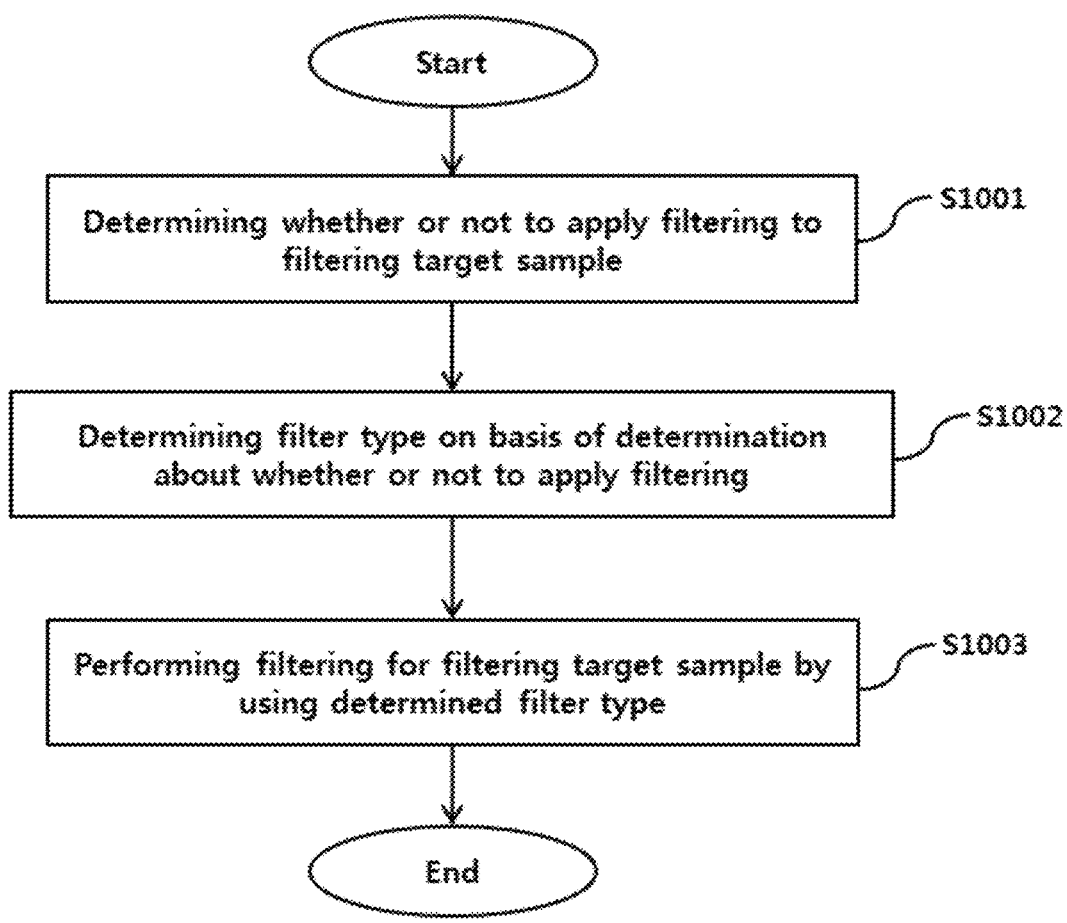
FIG. 10 is a view of a flowchart showing an image decoding method according to an embodiment of the present invention.

FIG. 10 is a view of a flowchart showing an image decoding method according to an embodiment of the present invention.

Referring to FIG. 10, in S1001, the decoder may determine whether or not to apply filtering to a filtering target sample.

The filtering target sample may include at least one of a prediction sample, a reference sample, a reconstructed sample, and a residue sample.

Meanwhile, whether or not to apply filtering may be determined on the basis of at least one of a coding mode, an intra-prediction mode, an inter-prediction mode, transform information, filtering information, a size (horizontal or vertical size), a shape, and a reference sample line of a current block, and a coding mode, an intra-prediction mode, an inter-prediction mode, transform information, filtering information, a size (horizontal or vertical size), a shape, and a reference sample line of a neighbor block.

Meanwhile, whether or not to apply the filtering may be determined on the basis of whether or not the current block has a non-square shape.

Meanwhile, whether or not to apply the filtering may be determined on the basis of whether or not an intra-prediction mode of the current block is a predetermined directional mode.

In addition, in S1002, the decoder may determine a filter type on the basis of the result of whether or not to apply the filtering.

Meanwhile, the filter type may include at least one of a filter tap, a filter shape, and a filter coefficient.

Meanwhile, when it is determined to apply filtering to the filtering target sample, the filter type may be determined.

Meanwhile, the filter type may be determined on the basis of a location of the filtering target sample.

Meanwhile, the filter type may be determined on the basis of at least one of a size and a prediction mode of the current block.

In addition, in S1003, the decoder may perform filtering for the filtering target sample by using the determined filter type.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used when performing image encoding/decoding

The invention claimed is:

1. A video decoding method comprising:
   determining a prediction sample of a current block based on an intra prediction mode of the current block;
   determining whether to filter the prediction sample of the current block; and
   in response that the prediction sample is determined to be filtered, filtering the prediction sample of the current block based on a position of the prediction sample,
   wherein whether to filter the prediction sample of the current block is determined based on a reference line index indicating a reference line referenced by the current block among at least one of reference line near the current block, wherein the prediction sample of the current block is determined not to be filtered when the reference line index does not indicate a first reference line immediately adjacent to the current block, wherein the prediction sample of the current block is filtered based on a weighted sum of the prediction sample and at least one reference sample of the prediction sample, and the at least one reference sample is determined based on a position of the prediction sample and the intra prediction mode, wherein the weighted sum is calculated by using weights that are applied to the prediction sample and the at least one reference sample, and wherein a weight for a reference sample among at least one reference sample decreases and a weight for the prediction sample increases, as the distance between the prediction sample and the reference sample increases.

2. The video decoding method of claim 1, wherein whether to filter the prediction sample of the current block is determined based on at least one of the intra prediction mode, a block size, a transform skip information.

3. The video decoding method of claim 2, wherein the prediction sample of the current block is determined to be filtered when the intra prediction mode is one of a planar mode, a DC mode, a horizontal mode, a vertical mode or when an index of the intra prediction mode having a prediction direction is less than 10 or greater than 58.

4. The video decoding method of claim 2, wherein the transform skip information indicates whether a transform process of residual samples in the current block is skipped,
wherein the prediction sample of the current block is determined not to be filtered when the transform skip information indicates that the transform process of the residual samples in the current block is skipped.

5. The video decoding method of claim 1, wherein the at least one reference sample includes a top reference sample and a left reference sample,
the top reference sample is located above the prediction sample, and
the left reference sample is located left to the prediction sample.

6. The video decoding method of claim 1, wherein the at least one reference sample includes an opposite-direction reference sample that is determined based on an opposite-directional line and a first reference line, and
the first reference line is immediately adjacent to the current block and the opposite-directional line has a direction that is opposite to a prediction direction of the intra prediction mode.

7. The video decoding method of claim 6, wherein the opposite-direction reference sample is located at an integer location closest to the opposite-directional line.

8. A video encoding method comprising:
determining a prediction sample of a current block based on an intra prediction mode of the current block;
determining whether to filter the prediction sample of the current block; and
in response that the prediction sample is determined to be filtered, filtering the prediction sample of the current block based on a position of the prediction sample,
wherein whether to filter the prediction sample of the current block is determined based on a reference line index indicating a reference line referenced by the current block among at least one of reference line near the current block, wherein the prediction sample of the current block is determined not to be filtered when the reference line index does not indicate a first reference line immediately adjacent to the current block, wherein the prediction sample of the current block is filtered based on a weighted sum of the prediction sample and at least one reference sample of the prediction sample, and the at least one reference sample is determined based on a position of the prediction sample and the intra prediction mode, wherein the weighted sum is calculated by using weights that are applied to the prediction sample and the at least one reference sample, and wherein a weight for a reference sample among at least one reference sample decreases and a weight for the prediction sample increases, as the distance between the prediction sample and the reference sample increases.

9. The video encoding method of claim 8, wherein whether to filter the prediction sample of the current block is determined based on at least one of the intra prediction mode, a block size, a transform skip information.

10. The video encoding method of claim 9, wherein the prediction sample of the current block is determined to be filtered when the intra prediction mode is one of a planar mode, a DC mode, a horizontal mode, a vertical mode or when an index of the intra prediction mode having a prediction direction is less than 10 or greater than 58.

11. The video encoding method of claim 9, wherein the transform skip information indicates whether a transform process of residual samples in the current block is skipped,
wherein the prediction sample of the current block is determined not to be filtered when the transform skip information indicates that the transform process of the residual samples in the current block is skipped.

12. The video encoding method of claim 8, wherein the at least one reference sample includes a top reference sample and a left reference sample,
the top reference sample is located above the prediction sample, and
the left reference sample is located left to the prediction sample.

13. The video encoding method of claim 8, wherein the at least one reference sample includes an opposite-direction reference sample that is determined based on an opposite-directional line and a first reference line,
the first reference line is immediately adjacent to the current block and the opposite-directional line has a direction that is opposite to a prediction direction of the intra prediction mode, and
wherein the opposite-direction reference sample is located at an integer location closest to the opposite-directional line.

14. A non-transitory computer readable recording medium storing a bitstream which is generated by using an image encoding method, wherein the image encoding method comprises:
determining a prediction sample of a current block based on an intra prediction mode of the current block;
determining whether to filter the prediction sample of the current block; and
in response that the prediction sample is determined to be filtered, filtering the prediction sample of the current block based on a position of the prediction sample,
wherein whether to filter the prediction sample of the current block is determined based on a reference line index indicating a reference line referenced by the current block among at least one of reference line near the current block, wherein the prediction sample of the current block is determined not to be filtered when the reference line index does not indicate a first reference line immediately adjacent to the current block, wherein the prediction sample of the current block is filtered based on a weighted sum of the prediction sample and at least one reference sample of the prediction sample, and the at least one reference sample is determined based on a position of the prediction sample and the intra prediction mode, wherein the weighted sum is calculated by using weights that are applied to the prediction sample and the at least one reference sample, and wherein a weight for a reference sample among at least one reference sample decreases and a weight for the prediction sample increases, as the distance between the prediction sample and the reference sample increases.

* * * * *